(12) United States Patent
Takatsuki

(10) Patent No.: US 12,168,589 B2
(45) Date of Patent: Dec. 17, 2024

(54) IMAGE READING APPARATUS, IMAGE FORMING APPARATUS, AND IMAGE READING METHOD

(71) Applicant: KYOCERA Document Solutions Inc., Osaka (JP)

(72) Inventor: Yasushi Takatsuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 181 days.

(21) Appl. No.: 18/003,668

(22) PCT Filed: Jun. 25, 2021

(86) PCT No.: PCT/JP2021/024108
§ 371 (c)(1),
(2) Date: Dec. 28, 2022

(87) PCT Pub. No.: WO2022/004587
PCT Pub. Date: Jan. 6, 2022

(65) Prior Publication Data
US 2023/0312285 A1    Oct. 5, 2023

(30) Foreign Application Priority Data

Jun. 29, 2020   (JP) .................................. 2020-111232

(51) Int. Cl.
*B65H 7/02*        (2006.01)
*H04N 1/00*        (2006.01)
(52) U.S. Cl.
CPC ........... *B65H 7/02* (2013.01); *H04N 1/00718* (2013.01); *B65H 2553/30* (2013.01); *B65H 2553/414* (2013.01)

(58) Field of Classification Search
CPC ...... B65H 2553/30; B65H 2301/51612; B65H 7/02; H04N 1/0249; H04N 9/77; H04N 1/00779; H04N 1/00774
See application file for complete search history.

(56) References Cited

U.S. PATENT DOCUMENTS 6,704,523 B2 *  3/2004  Takeuchi ................. B65H 7/14
                                                        399/9
6,937,263 B2 *  8/2005  Namiki .............. H04N 1/00734
                                                      250/559.1
(Continued)

FOREIGN PATENT DOCUMENTS

JP        2000072267 A      3/2000
JP        2001169027 A  *   6/2001
(Continued)

*Primary Examiner* — Howard J Sanders
(74) *Attorney, Agent, or Firm* — Alleman Hall & Tuttle LLP

(57) ABSTRACT

A sheet feed roller portion (12) feeds a plurality of bound sheets (S1) to a conveying path (18). The ultrasonic sensor (19) detects a voltage value that changes according to a thickness of the sheet (S1) at a measurement position (P2) on the conveying path (18). A determination processing portion (53) determines whether or not a voltage difference between voltage values of the sheet (S1) detected by the ultrasonic sensor (19) is equal to or greater than a preset threshold value. A light amount adjustment processing portion (54) adjusts a light amount of light emitted from a CIS sensor (23) and irradiated onto the sheet (S1) when the determination processing portion (53) determines that the voltage difference is equal to or greater than the threshold value.

7 Claims, 7 Drawing Sheets

(56) References Cited

U.S. PATENT DOCUMENTS

| | | | | |
|---|---|---|---|---|
| 7,802,789 | B2* | 9/2010 | Tokita | B26F 1/0092 |
| | | | | 271/265.01 |
| 8,169,670 | B2* | 5/2012 | Motoyama | H04N 1/00774 |
| | | | | 358/488 |
| 9,628,649 | B2* | 4/2017 | Mori | H04N 1/00718 |
| 11,956,394 | B2* | 4/2024 | Arai | H04N 1/00 |
| 2018/0343353 | A1* | 11/2018 | Fukumitsu | H04N 1/00734 |
| 2018/0343361 | A1 | 11/2018 | Okada | |
| 2019/0227426 | A1* | 7/2019 | Hayamizu | H04N 1/00716 |
| 2020/0296244 | A1* | 9/2020 | Hirayama | H04N 1/00816 |
| 2021/0405565 | A1* | 12/2021 | Nonoyama | G03G 15/6594 |

FOREIGN PATENT DOCUMENTS

| | | | | |
|---|---|---|---|---|
| JP | 2004193744 | A | * | 7/2004 |
| JP | 2010028390 | A | * | 2/2010 |
| JP | 2013021626 | A | | 1/2013 |
| JP | 2017208627 | A | | 11/2017 |
| JP | 2018198353 | A | | 12/2018 |

* cited by examiner

IMAGE READING APPARATUS, IMAGE FORMING APPARATUS, AND IMAGE READING METHOD

TECHNICAL FIELD

The present invention relates to an image reading apparatus, an image forming apparatus, and an image reading method.

BACKGROUND ART

An image forming apparatus having a scanning function, a printing function, and the like includes a sheet feeding device that feeds sheets. In the sheet feeding device, among a plurality of sheets stacked in a sheet stacking portion such as a sheet feed cassette, a top sheet is delivered to a conveying path by a delivery roller such as a pickup roller. In this type of sheet feeding device, a plurality of sheets may be delivered to the conveying path by the delivery roller. In this case, problems such as paper jams may occur in the conveying path. On the other hand, a sheet feeding device is known in which a separation mechanism is provided for separating a plurality of sheets delivered by a delivery roller into a top first sheet and a second sheet at a position lower than the first sheet (for example, see Patent Literature 1).

CITATION LIST

Patent Literature

Patent Literature 1: JP 2000-72267 A

SUMMARY OF INVENTION

Technical Problem

There are cases in which a plurality of bound sheets having at least one of four sides glued together are placed on a sheet placement portion of the sheet conveying device and fed. In this case, when a process of separating the sheets is performed, a problem of the sheets becoming damaged may occur. In addition, in a case of reading an image of the sheets in an image reading process, a problem of decreased reading accuracy may occur due to influence of a thickness or the like of the sheets.

An object of the present invention is to provide an image reading apparatus, an image forming apparatus, and an image reading method capable of improving reading accuracy of a plurality of bound sheets.

Solution to Problem

An image reading apparatus according to one aspect of the present invention includes a sheet feed portion, a sheet detection portion, a determination processing portion, and an execution processing portion. The sheet feed portion feeds a plurality of bound sheets to a conveying path. The sheet detection portion detects a detection value that changes according to a thickness of the sheets at a predetermined measurement position on the conveying path. The determination processing portion determines whether or not a fluctuation value of the detection value of the sheets detected by the sheet detection portion is equal to or greater than a preset threshold value. In a case where the determination processing portion determines that the fluctuation value is equal to or greater than the threshold value, the execution processing portion executes specific processing corresponding to the sheets.

An image forming apparatus according to another aspect of the present invention includes the image reading apparatus and an image forming portion that forms an image on a sheet.

An image reading method according to another aspect of the present invention includes a sheet feed step, a sheet detection step, a determination step, and an execution step. The sheet feed step feeds a plurality of bound sheets to a conveying path. The sheet detection step detects a detection value that changes according to a thickness of the sheets at a predetermined measurement position on the conveying path. The determination step determines whether or not a fluctuation value of the detection value of the sheets detected in the sheet detection step is equal to or greater than a preset threshold value. In a case where it is determined in the determination processing step that the fluctuation value is equal to or greater than the threshold value, the execution step executes specific processing corresponding to the sheets.

Effect of Invention

With the present invention, an image reading apparatus, an image forming apparatus, and an image reading method capable of improving reading accuracy of a plurality of bound sheets are provided.

DESCRIPTION OF EMBODIMENTS

Hereinafter, embodiments of the present invention will be described with reference to the accompanying drawings for understanding of the present invention. Note that the following embodiments are examples that embody the present invention, and do not limit the technical scope of the present invention.

The image forming apparatus according to the present invention is, for example, a multifunction peripheral having a plurality of functions such as a scanning function for reading an image from a sheet (document sheet or the like), a printing function for forming an image based on image data read from a sheet or externally acquired, a facsimile function, and a copying function. Note that the image forming apparatus according to the present invention can be applied to scanners, printers, facsimiles, copiers, and the like. In the following, of the plurality of functions of the image forming apparatus 10 as a multifunction peripheral, the scanning function will be described as an example.

Figure 1:
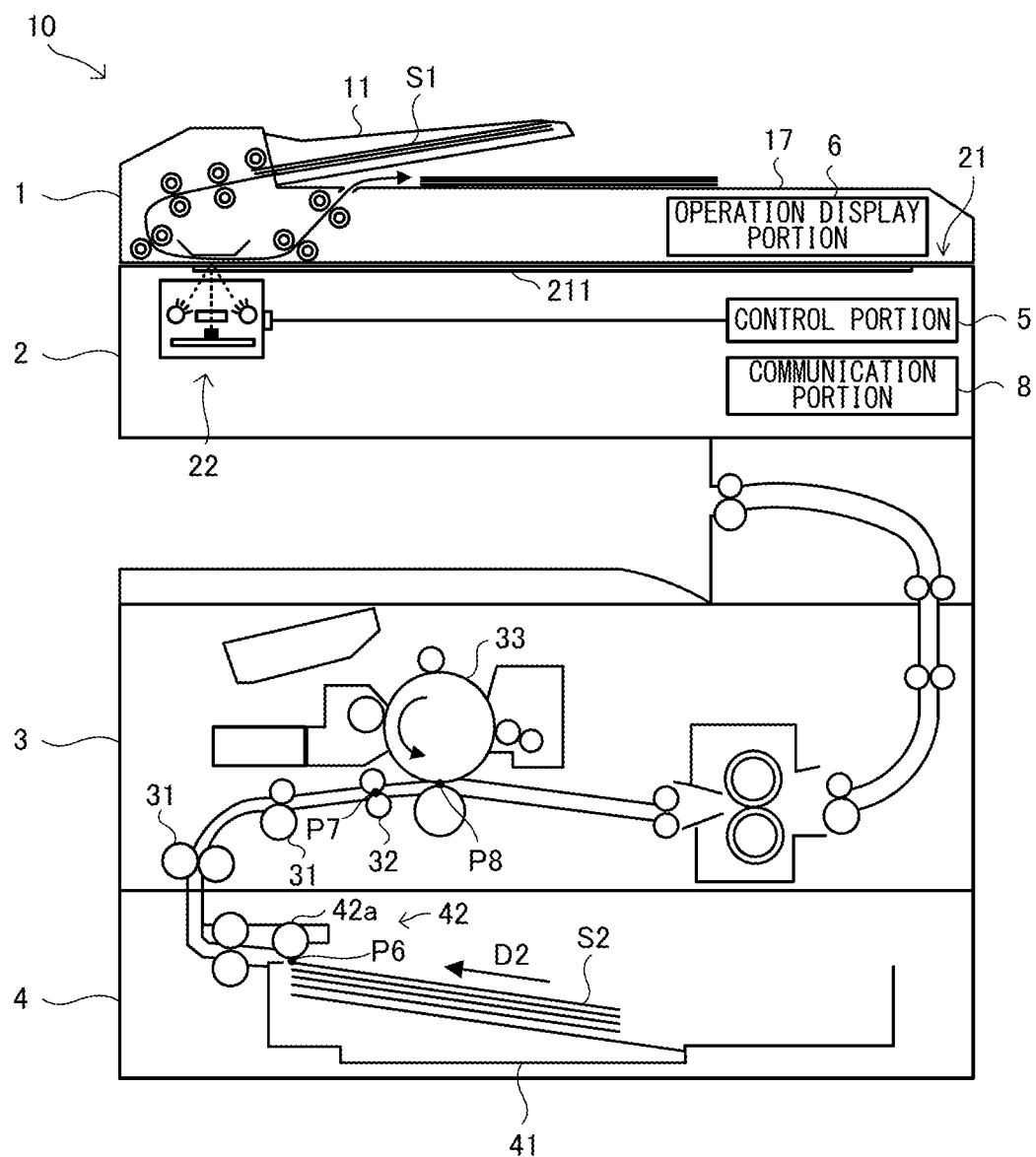
FIG. 1 is a schematic cross-sectional view showing a schematic configuration of an image forming apparatus according to an embodiment of the present invention.
Figure 2:
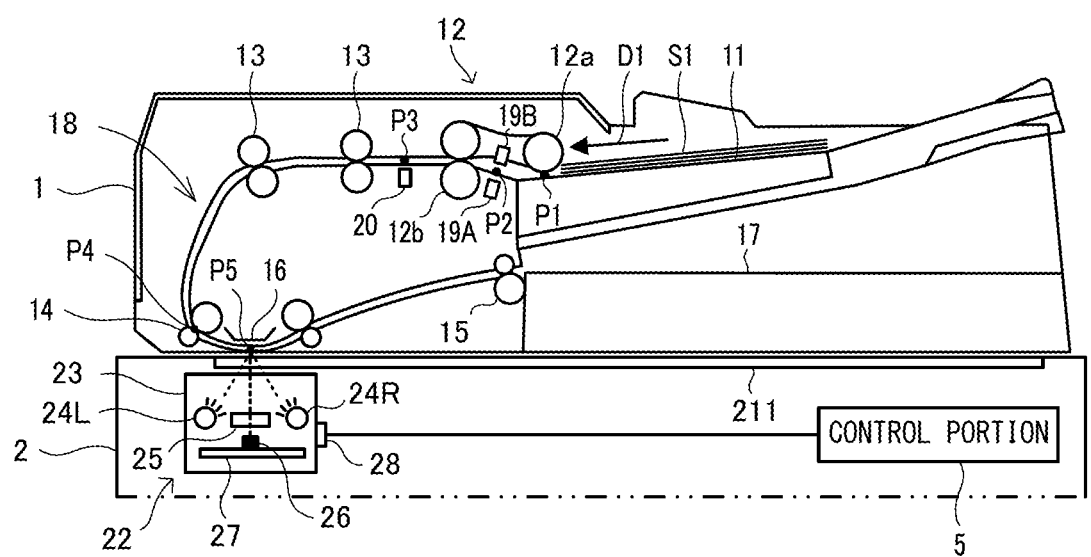
FIG. 2 is a schematic cross-sectional view showing a schematic configuration of relevant parts of an automatic document feeder (ADF) and an image reading portion of an image forming apparatus according to an embodiment of the present invention.
Figure 3:
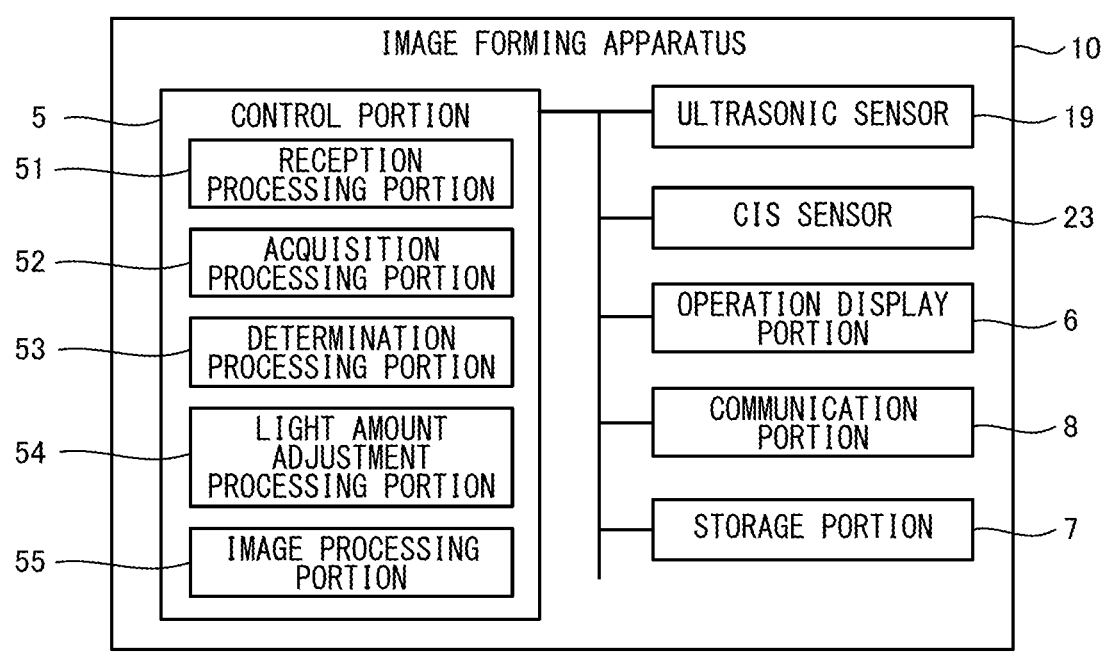
FIG. 3 is a functional block diagram showing functions of an image forming apparatus according to an embodiment of the present invention.

As shown in FIGS. 1, 2 and 3, an image forming apparatus 10 mainly includes an ADF 1 (sheet conveying device), an image reading portion 2, an image forming portion 3, a sheet feed portion 4, a control portion 5, an operation display portion 6, a storage portion 7 and a communication portion 8.

The operation display portion 6 includes an operation portion such as operation keys or a touch panel for receiving user operations and inputting various types of information to the control portion 5 according to the operations, and a display portion such as a liquid crystal display for displaying various types of information according to commands output from the control portion 5. For example, in a case where a user performs a scanning operation (image reading instruction) on the operation display portion 6, information corresponding to the scanning operation is input to the control portion 5. The control portion 5, according to the scanning operation, executes a scanning process including various processes. Note that the user may use a user terminal connected to a network via the communication portion 8 to perform various types of operations.

The ADF 1 includes a sheet placement portion 11, a conveying path 18, a sheet feed roller portion 12 (an example of the sheet feed portion of the present invention), a plurality of conveying rollers 13, a registration roller 14 (registration portion), a discharge roller 15, a sheet guide 16, and a discharge tray 17.

In addition, the ADF 1 also includes an ultrasonic sensor 19 and a sheet feed sensor 20. The ultrasonic sensor 19 is an example of a sheet detection portion of the present invention. The sheet feed sensor 20 is composed of, for example, an optical sensor.

Figure 4:
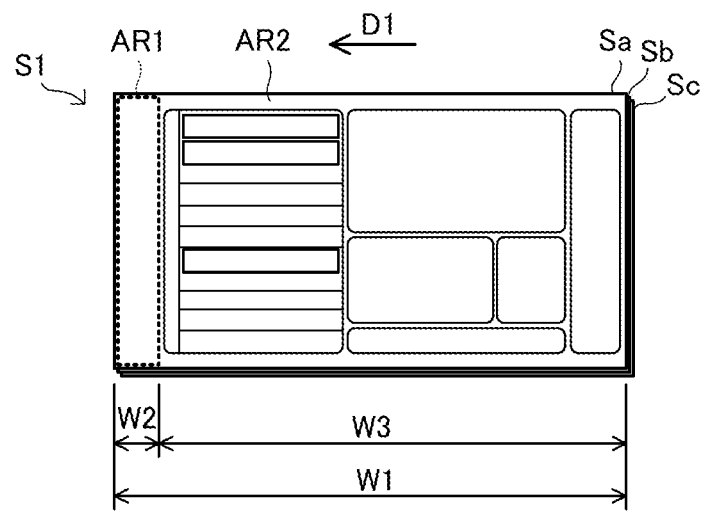
FIG. 4 is a diagram showing an example of sheets that are read by an image forming apparatus according to an embodiment of the present invention.
Figure 5:
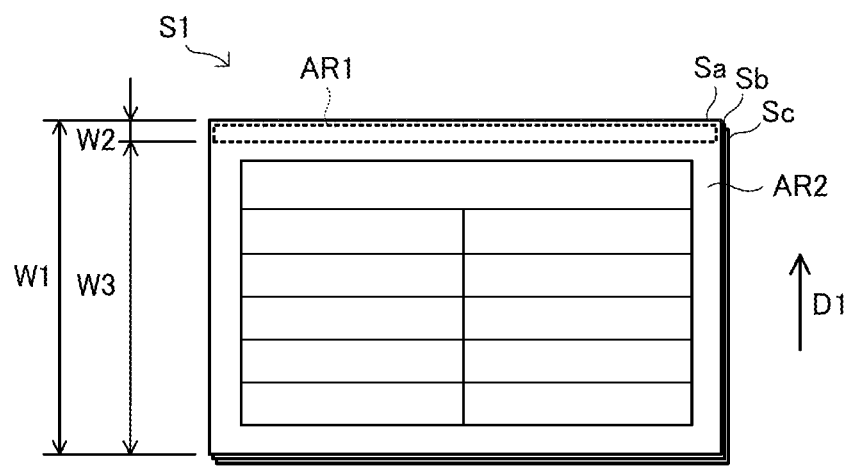
FIG. 5 is a diagram showing an example of sheets that are read by an image forming apparatus according to an embodiment of the present invention.

The ADF 1 is controlled by the control portion 5 to sequentially convey a plurality of sheets S1 placed on the sheet placement portion 11. In addition, in a case where the sheets S1 are a plurality of bound sheets of which at least one of four sides is adhered by gluing or the like, the ADF 1 conveys the plurality of bound sheets S1. FIG. 4 and FIG. 5 show an example of a plurality of bound sheets S1. For example, as shown in FIG. 4 and FIG. 5, forms (ledgers, slips) such as shipping invoices, purchase ledgers, sales ledgers, and invoices are composed of a top entry sheet Sa and a plurality of copy sheets Sb and Sc below the entry sheet Sa. Note that the plurality of bound sheets S1 are not limited to copy sheets.

In the case of the sheets S1 shown in FIG. 4, the left edges of three sheets Sa, Sb, and Sc are glued together. In addition, a width W2 of a part of a left end of an entire width W1 of the sheets S1 is a glued area, and a remaining area AR2 of a remaining width W3 overlaps so that the three sheets Sa, Sb, and Sc can be turned over.

In the case of the sheets S1 shown in FIG. 5, upper edges of the three sheets Sa, Sb, and Sc are glued together. In addition, a width W2 of a part of an upper end of an entire width W1 of the sheets S1 is a glued area, and a remaining area AR2 having a remaining width W3 overlaps so that the three sheets Sa, Sb, and Sc can be turned over.

The plurality of bound sheets S1 are placed on the sheet placement portion 11 so that the glued area AR1 faces the conveying direction D1, and the plurality of sheets are conveyed in a bound state. Note that the glued area AR1 of the sheets S1 is an example of a first area of the present invention, and the remaining area (remaining area AR2) of the sheets S1 excluding the glued area AR1 is an example of a second area of the present invention.

A conveying path 18 is a moving path for the sheets S1 conveyed by the ADF 1, and is formed by a pair of conveying guide members.

The sheet feed roller portion 12 (sheet feed portion) includes a pickup roller 12a and a separation roller 12b. By driving the pickup roller 12a by a motor (not shown) whose driving is controlled by the control portion 5, the pickup roller 12a pulls out the sheets S1 one by one at a sheet feed start position P1 where the sheets S1 are started to be fed, and conveys the sheets S1 in the conveying direction D1 (see FIG. 2). In addition, the pickup roller 12a treats a plurality of bound sheets S1 as one set, and the pulls out the sets of sheets S1 one set at a time and conveys the set in the conveying direction D1.

More specifically, when starting an image reading process in a scanning process, the control portion 5 controls the pickup roller 12a and the conveying rollers 13 to move a sheet S1 from the sheet placement portion 11 to the registration roller 14. When the sheet S1 reaches the registration roller 14 (registration position P4), the control portion 5 stops the registration roller 14. After that, in a case where the image reading process becomes possible, the control portion 5 starts driving the registration roller 14 to resume the conveyance of the sheet S1, starts the image reading process at the image reading position P5, and reads an image of the sheet S1. When the image reading process ends, the control portion 5 discharges the sheet S1 to the discharge tray 17.

The ultrasonic sensor 19 detects a detection value that changes according to the thickness of the sheet S1 at the measurement position P2 on the conveying path 18. More specifically, the ultrasonic sensor 19 detects (measures) a voltage value corresponding to the thickness of the sheet S1 pulled out by the pickup roller 12a. As shown in FIG. 2, the ultrasonic sensor 19 has a transmitting portion 19A and a receiving portion 19B which are arranged facing each other with the conveying path 18 interposed therebetween. The transmitting portion 19A transmits ultrasonic waves toward the conveying path 18. The receiving portion 19B receives the ultrasonic waves transmitted from the transmitting portion 19A. The ultrasonic sensor 19 outputs an electrical signal corresponding to intensity of the ultrasonic waves received by the receiving portion 19B. The electric signal (voltage value) output from the ultrasonic sensor 19 is input to the control portion 5. Based on the voltage value acquired from the ultrasonic sensor 19, the control portion 5 detects multi-feeding in which a plurality of sheets S1 overlap and are conveyed from the sheet placement portion 11. For example, the control portion 5 detects multi-feeding of sheets S1 in a case where the voltage value acquired from the ultrasonic sensor 19 is less than a threshold value. In a case where the control portion 5 detects multi-feeding, the control portion 5 rotates the separation roller 12b in a direction opposite to the conveying direction D1 (reverse rotation) to separate the plurality of sheets S1.

Here, in a case of conveying a plurality of bound sheets S1, the control portion 5 stops (turns OFF) the multi-feeding detection function in order to prevent separation of the sheets S1. For example, in a case where the user performs an image reading operation by placing a plurality of bound sheets S1 on the sheet placement portion 11 and sets the document sheet manual feeding mode, the control portion 5 does not detect multi-feeding in a case where the voltage value is less than a threshold value. In this case, the control portion 5 rotates (forward rotates) the separation roller 12b in the conveying direction D1 to convey the plurality of bound sheets S1 in an overlapping state. Note that the control portion 5 acquires the detection value from the ultrasonic sensor 19 even in a case where the multi-feeding detection function is stopped.

For example, the ultrasonic sensor 19 is provided on a downstream side of the sheet feed start position P1 where the feeding of the sheet feed sensor S1 is started and on an upstream side of the sheet feed sensor 20 (position between the sheet feed start position P1 and the measurement position P3) (measurement position P2). Note that the ultrasonic sensor 19 may be a reflective-type ultrasonic sensor that emits ultrasonic waves to the sheet S1 and receives reflected waves reflected by the sheet S1.

The sheet feed sensor 20 (sheet feed detection portion) detects a so-called no-feed paper jam (presence or absence of the sheet S1) in which the sheet S1 is not properly fed from the sheet feed roller portion 12 and a front end of the sheet S1 does not reach the conveying roller 13. The sheet feed sensor 20 is provided on a downstream side of the sheet feed roller portion 12 and on an upstream side of the conveying rollers 13 (position between the sheet feed roller portion 12 and the conveying rollers 13) (measurement position P3).

The image reading portion 2 is controlled by the control portion 5 to execute the image reading process of reading an image from the sheet S1 guided to a contact glass 211 by the ADF 1. The image reading portion 2 is an example of the image reading apparatus of the present invention. In addition, the image reading portion 2 reads the image of the sheet S1 at the same resolution as a resolution set by the user. For example, as shown in FIG. 1, the image reading portion 2 includes a sheet table 21, a reading unit 22, and the like. The sheet table 21 is provided on an upper surface of the housing of the image forming apparatus 10.

The reading unit 22 is provided below the contact glass 211. The reading unit 22 is configured to be movable in a sub-scanning direction (left-right direction of the paper surface in FIG. 1) by a moving mechanism (not shown) having a drive portion such as a stepping motor. For example, the reading unit 22 is moved to a position facing the sheet guide 16 of the ADF 1 (image reading position P5) by the moving mechanism. The reading unit 22 includes a contact image sensor (hereinafter referred to as a CIS sensor) 23 and a holding portion (not shown) that holds the CIS sensor 23 and is driven in the sub-scanning direction by the moving mechanism. The CIS sensor 23 is an example of a light amount detecting portion of the present invention.

The CIS sensor 23 irradiates the sheet S1 with light and detects reflected light from the sheet S1. The CIS sensor 23 is held so as to be kept at a constant distance from the contact glass 211. The CIS sensor 23 includes a light source 24 that emits light toward the sheet S1 on the contact glass 211, a plurality of light receiving elements 26 (for example, CMOS) arranged in a main scanning direction, a sensor substrate 27 on which the plurality of light receiving elements 26 are mounted, and a lens 25 provided above the light receiving elements 26.

The light source 24 is, for example, a plurality of white LEDs or multicolor LEDs arranged along the main scanning direction (depth direction of the paper surface in FIG. 1). The light source 24 emits light for one line in the main scanning direction toward the contact glass 211. The light emitted from the light source 24 passes through the contact glass 211 and irradiates the sheet S1 conveyed by the ADF1. As shown in FIG. 2, the light source 24 may be arranged in two rows in the sub-scanning direction. For example, as shown in FIG. 2, the CIS sensor 23 includes: a right-row light source 24R arranged on the conveying direction D1 side of the image reading position P5 and irradiates the sheet S1 with light from the right side; and a left-row light source 24L arranged on the side opposite to the conveying direction D1 from the image reading position P5 and irradiates the sheet S1 with light from the left side. The light source 24R is an example of a first light source of the present invention, and the light source 24L is an example of a second light source of the present invention.

The CIS sensor 23 is provided with a connector 28, and the connector 28 is connected to the control portion 5 via wiring.

In the CIS sensor 23, when the sheet S1 is conveyed to the image reading position P5, the light sources 24L and 24R emit light to the sheet S1, and the light reflected by the sheet S1 enters the lens 25. The lens 25 collects the incident light and emits the light to the light receiving elements 26. The light receiving elements 26 output an electrical signal (analog signal) corresponding to an amount of received light. The analog signal output from the light receiving elements 26 is converted into a digital signal (image data) by the sensor substrate 27 and input to the control portion 5. When acquiring the image data, the control portion 5 stores the image data in the storage portion 7 and executes predetermined image processing based on the image data. The image reading portion 2 reads the image of the sheet S1 by the processing above.

The storage portion 7 is a storage device such as a solid state drive (SSD) or a hard disk drive (HDD). The storage portion 7 includes an image data storage portion (not shown). For example, the image data storage portion stores image data read by the image reading portion 2.

The control portion 5 includes control devices such as a CPU, ROM, and RAM. In addition, the control portion 5 includes a non-volatile storage portion (not shown) such as an EEPROM (registered trademark). The CPU is a processor that executes various types of arithmetic processes. The ROM is a non-volatile storage portion in which information such as a control program for causing the CPU to execute various types of processes is stored in advance. The RAM is a volatile or non-volatile storage portion used as a temporary storage memory (work area) for various types of processes executed by the CPU. Note that the control portion 5 may include an electronic circuit that implements the various types of processes described above.

In the image forming apparatus 10, there are cases in which a plurality of bound sheets S1 having at least one of four sides glued together are placed on the sheet placement portion of the sheet conveying device and fed. In this case, when performing a process of separating the sheets S1, a problem of the sheets S1 becoming damaged may occur. In addition, in a case of reading an image of the sheets S1 in an image reading process, a problem of decreased reading accuracy may occur due to influence of a thickness or the like of the sheets S1. However, in the image forming apparatus 10 according to the present embodiment, it is possible to improve the accuracy of reading a plurality of bound sheets S1.

More specifically, as shown in FIG. 3, the control portion 5 includes a reception processing portion 51, an acquisition processing portion 52, a determination processing portion 53, a light amount adjustment processing portion 54, and an image processing portion 55. The control portion 5, by causing the CPU to execute processing according to a program stored in the ROM, functions as the reception processing portion 51, the acquisition processing portion 52, the determination processing portion 53, the light amount adjustment processing portion 54, and the image processing portion 55. Note that one or more of the reception processing portion 51, the acquisition processing portion 52, the determination processing portion 53, the light amount adjustment processing portion 54, and the image processing portion 55 may be an electronic circuit such as an ASIC. In addition, the program may be stored in a computer-readable storage medium such as a CD-ROM, DVD-ROM, or memory card, and may be installed in the image forming apparatus 10 from the storage medium, or may be downloaded from a communication network such as the Internet.

The reception processing portion 51 receives various types of operations for the image forming apparatus 10 from the user. For example, in a case where the user places a plurality of bound sheets S1 on the sheet placement portion 11 so that the glued area AR1 (see FIG. 4 and FIG. 5) faces in the conveying direction D1, selects a document sheet manual feed mode on the operation display portion 6, and issues an image reading instruction, the reception processing portion 51 receives the document sheet manual feed mode instruction and the image reading instruction.

After receiving the image reading instruction, the reception processing portion 51 drives the sheet feed roller portion 12 to pull out the sheets S1 one set at a time at the sheet feed start position P1 and convey the sheets S1 in the conveying direction D1 (see FIG. 2).

In addition, after receiving an operation to select the document sheet manual feed mode from the user, the reception processing portion 51 stops (turns OFF) the multi-feeding detection function. That is, after receiving an operation to select the document sheet manual feed mode, the reception processing portion 51 rotates (forward rotates) the separation roller 12b in the conveying direction D1, thereby conveying the plurality of bound sheets S1 pulled out from the paper feed start position P1 as are in an overlapping state. Note that the control portion 5 may set the document sheet manual feed mode and stop the multi-feeding detection function in a case where it is detected that the sheet S1 is placed on the sheet placement portion 11 or the manual feed tray.

The acquisition processing portion 52 acquires a voltage value corresponding to the thickness of the sheet S1 detected by the ultrasonic sensor 19 at the measurement position P2 (see FIG. 2). For example, the ultrasonic sensor 19 starts the detection process when the operation of feeding the sheet S1 starts at the sheet feed start position P1, and ends the detection process in a case where the trailing edge of the sheet feed start position S1 is detected at the measurement position P3. Note that the ultrasonic sensor 19 may start and end the detection process based on a sensor (not shown) that detects the rotation of the sheet feed roller portion 12. When the ultrasonic sensor 19 starts the detection process, the transmitting portion 19A transmits ultrasonic waves to the sheet S1 conveyed to the measurement position P2, and the receiving portion 19B receives the ultrasonic waves passing through the sheet S1. The ultrasonic sensor 19 converts the intensity, attenuation factor, and the like of the received ultrasonic waves into a voltage value and outputs the voltage value to the control portion 5. The ultrasonic sensor 19 executes the detection process for each sheet S1 or for each plurality (set) of bound sheets S1. The acquisition processing portion 52 acquires the voltage value from the ultrasonic sensor 19.

Figure 6:
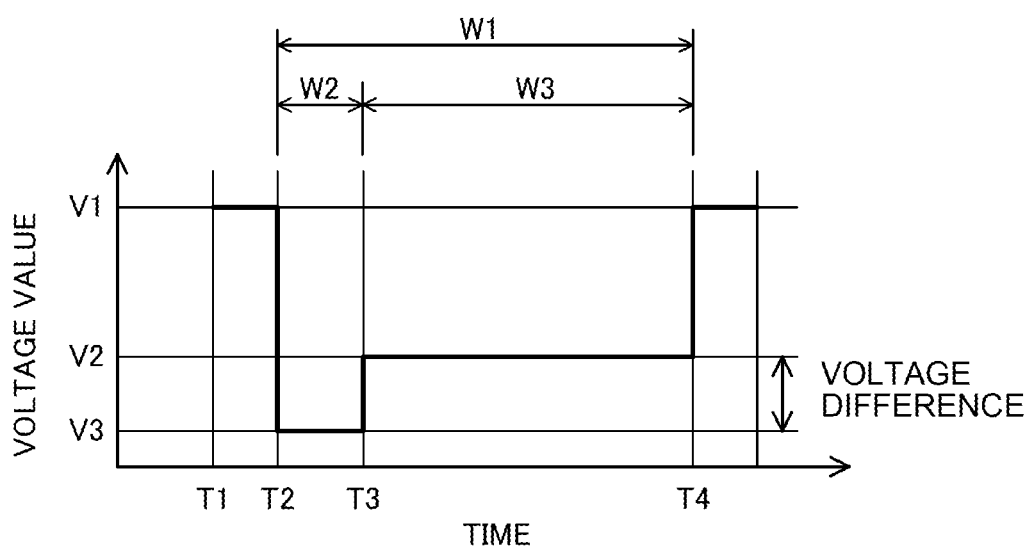
FIG. 6 is a diagram showing an example of changes in a voltage value detected by an ultrasonic sensor of an image forming apparatus according to an embodiment of the present invention.

FIG. 6 is a graph showing an example of changes in the voltage value acquired by the acquisition processing portion 52 through the detection process by the ultrasonic sensor 19 for a plurality (set) of bound sheets S1. Note that FIG. 6 shows the result of the detection process for the sheets S1 shown in FIG. 4.

In FIG. 6, reference sign T1 indicates the start time of the detection process, and reference sign T4 indicates the end time of the detection process. As shown in FIG. 6, time T2 to T3 indicates the voltage value of the glued area AR1 (width W2) of the sheets S1, and time T3 to T4 indicates the voltage value of the remaining area AR2 (width W3) of the sheets S1.

For example, in the time T2 to T3, when the ultrasonic waves emitted from the ultrasonic sensor 19 are incident on the glued area AR1, the amount of ultrasonic waves passing through the glued area AR1 decreases, and thus the voltage value changes from V1 to V3 (V3<V1).

At subsequent time T3 to T4, when the ultrasonic waves transmitted from the ultrasonic sensor 19 are incident on the remaining area AR2, the amount of passing through the remaining area AR2 becomes greater than the amount of the ultrasonic waves passing through the glued area AR1, and thus the voltage value rises from V3 to V2. At time T4, when the trailing edge of the sheet S1 passes measurement position P2, the voltage value rises from V2 to V1. In this way, in a case where one sheet (one set) S1 has a glued area AR1, areas (AR1, AR2) having different ultrasonic intensities (voltage values) are generated in one sheet S1. That is, as shown in FIG. 6, a voltage difference (voltage fluctuation) occurs in one sheet S1.

The determination processing portion 53 determines whether or not the fluctuation value of the detection value of the sheet S1 detected by the ultrasonic sensor 19 is equal to or greater than a preset threshold value. More specifically, the determination processing portion 53 determines whether or not the voltage difference between the voltage value of the glued area AR1 of the sheet S1 and the voltage value of the remaining area AR2 of the sheet S1 is equal to or greater than a threshold value. In a case where the voltage difference is equal to or greater than the threshold value, the determination processing portion 53 determines that the sheet S1 is a plurality of sheets, such as forms, slips, or the like, of which at least one of the four sides are glued.

In addition, the determination processing portion 53 determines that the sheet S1 is one sheet in a case where the voltage difference is less than the threshold. Further, in a case where the voltage difference is less than the threshold value and the voltage value acquired from the ultrasonic sensor 19 is less than a predetermined value, the determination processing portion 53 determines that the sheet S1 is a thick sheet, and in a case where the voltage difference is less than the threshold value and the voltage value acquired from the ultrasonic sensor 19 is greater than or equal to a predetermined value, the determination processing portion 53 determines that the sheet S1 is a normal or thin sheet.

The light amount adjustment processing portion 54 adjusts the light amount of light emitted from the CIS sensor 23 and irradiated onto the sheet S1 in a case where the determination processing portion 53 determines that the voltage difference (fluctuation value) is equal to or greater than a threshold value. For example, in a case where the voltage difference is equal to or greater than the threshold value and the attenuation factor of the ultrasonic waves corresponding to the glued area AR1 is greater than the attenuation factor of the ultrasonic waves corresponding to the remaining area AR2, the light amount adjustment processing portion 54 makes the amount of light irradiated onto the glued area AR1 larger than the amount of light irradiated onto the remaining area AR2. For example, as shown in FIG. 6, in a case where the voltage difference (V2−V3) between the voltage value V3 of the glued area AR1 of the sheet S1 and the voltage value V2 of the remaining area AR2 of the sheet S1 is equal to or greater than the threshold value, and the voltage value V3 is lower than the voltage value V2, the light amount adjustment processing portion 54 makes the amount of light irradiated onto the glued area AR1 larger than the amount of light irradiated onto the remaining area AR2. In other words, the light amount adjustment processing portion 54 makes the amount of light irradiated onto the remaining area AR2 smaller than the amount of light irradiated onto the glued area AR1. That is, the light amount adjustment processing portion 54 increases the amount of light irradiated onto the glued area AR1 and reduces the amount of light irradiated onto the remaining area AR2. Thus, for example, the shadows of the end portions (edges) of the glued area AR1 and the remaining area AR2 can be emphasized.

Note that in a case where the voltage difference (V2−V3) is equal to or greater than the threshold value and the voltage value V3 is lower than the voltage value V2, the light amount adjustment processing portion 54 may reduce the amount of light irradiated onto the glued area AR1, and increase the amount of light irradiated onto the remaining area AR2. Thus, for example, the shadows of the end portions (edges) of the glued area AR1 and the remaining area AR2 can be made inconspicuous.

In addition, in a case where the determination processing portion 53 determines that the voltage difference is equal to or greater than the threshold value, the light amount adjustment processing portion 54 may make the light amounts of the light emitted from the light sources 24L and 24R different from each other. For example, in a case where the determination processing portion 53 determines that the voltage difference is equal to or greater than the threshold value, the light amount adjustment processing portion 54 makes the amount of light emitted from the light source 24L larger than the amount of light emitted from the light source 24R. Thus, for example, the shadow of the tip end (edge) of the glued area AR1 can be emphasized. Note that the light amount adjustment processing portion 54 adjusts the ratio (balance) of the light amounts of the light sources 24L and 24R according to the detection values (voltage values) from the ultrasonic sensor 19 and the voltage difference. The light amount adjustment processing portion 54 is an example of the execution processing portion of the present invention.

The image processing portion 55 reads an image of the sheet S1 irradiated with light whose light amount is adjusted, and executes predetermined image processing on the read image. For example, the image processing portion 55 executes a correction process for correcting the tilt of the read image in a case where the read image is tilted with respect to the sheet S1. Here, in the present embodiment, as described above, the light amount adjustment processing portion 54 adjusts the amount of light emitted from the CIS sensor 23 and irradiated onto the sheet S1, and thus the end portion of the sheet S1 can be appropriately recognized. Therefore, the accuracy of the correction process can be improved.

The image processing executed by the image processing portion 55 is not limited to the correction process described above, and includes various image processing. For example, the image processing portion 55 may execute OCR processing, cropping processing, or the like based on the read image. According to this embodiment, the accuracy of each type of image processing can be improved.

The image processing portion 55 is an example of an execution processing portion of the present invention. Note that in a case where the voltage difference is less than the threshold value and the voltage value acquired from the ultrasonic sensor 19 is less than a predetermined value, or in other words, in a case where the thickness of the sheet S1 is equal to or greater than a predetermined thickness, the execution processing portion of the present invention may cause the operation display portion 6 to display a warning message. In addition, in this case, the execution processing portion may stop the conveying process of the sheet S1, or may discharge the sheet S1 to a predetermined discharge tray.

[Image Reading Process]

Figure 7:
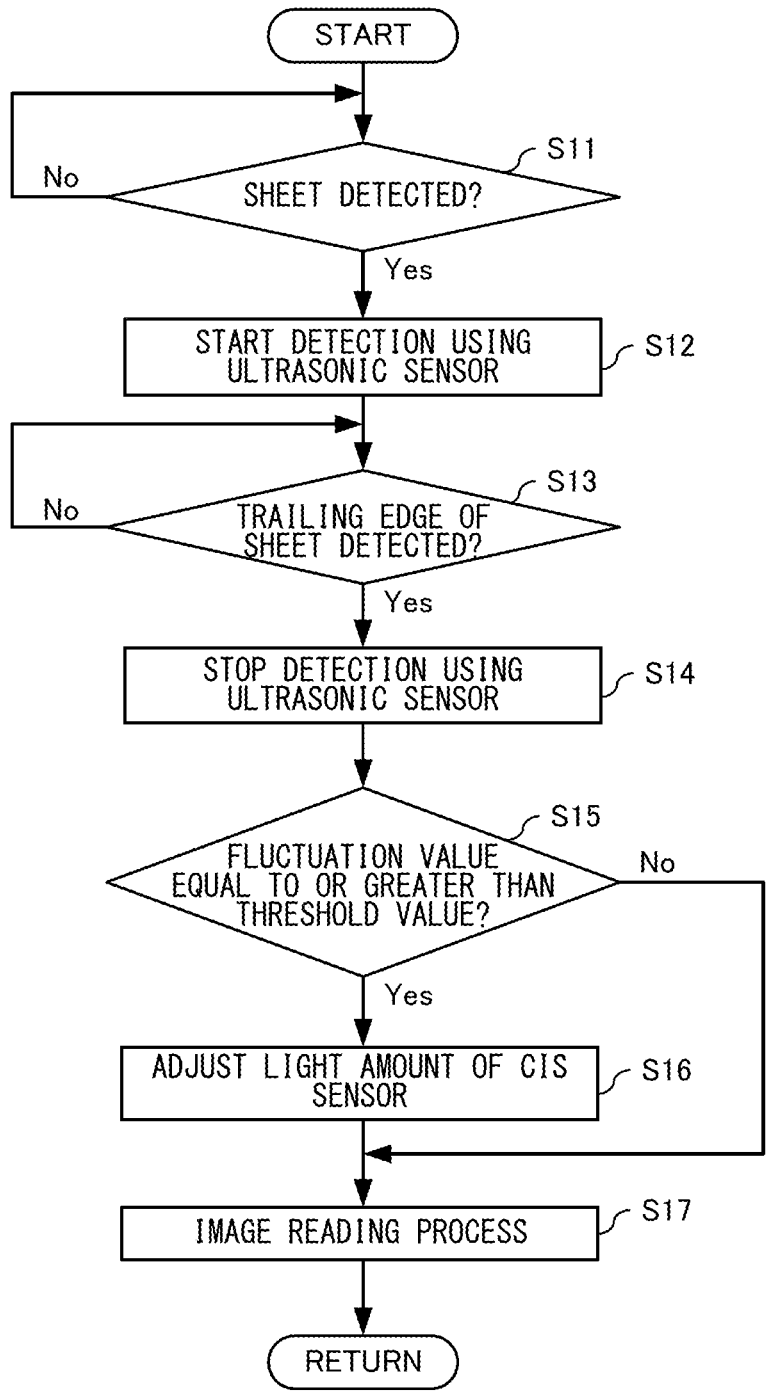
FIG. 7 is a flowchart for describing an example of a procedure of an image reading process executed by an image forming apparatus according to an embodiment of the present invention.

An example of the procedure of the image reading process executed by the control portion 5 in the image forming apparatus 10 will be described below with reference to the flowchart in FIG. 7. Each processing step executed by the control portion 5 is referred to as step S11, S12, and so on. Note that one or more steps included in the image reading process described here may be omitted as appropriate. In addition, each step in the image reading process may be executed in a different order to the extent that similar effects are produced. Furthermore, here, a case in which the steps in the image reading process are executed by the control portion 5 of the image forming apparatus 10 will be described as an example; however, in other embodiments, the steps in the image reading process may be distributed and executed by a plurality of other processors.

Here, the present invention can be regarded as an invention of an image reading method (an example of the image reading method of the present invention) that executes one or more steps included in the image reading process.

For example, the image reading process is executed in a case where the user sets the document sheet manual feed mode in the image forming apparatus 10, places a plurality of sheets S1 on the sheet placement portion 11, and gives an instruction for a scanning operation.

First, in step S11, the control portion 5 determines whether or not a sheet S1 has been detected. For example, in a case where a sheet S1 is placed on the sheet placement portion 11, the control portion 5 detects the sheet S1. In a case where the control portion 5 detects the sheet S1 (S11: Yes), the process proceeds to step S12. The control portion 5 waits until the sheet S1 is detected (S11: No).

In step S12, the control portion 5 causes the ultrasonic sensor 19 to start a detection process. For example, the control portion 5 causes the ultrasonic sensor 19 to start the detection process in a case where the sheet S1 starts to be conveyed at the sheet feed start position P1. The starting point of the detection process corresponds to time T1 shown in FIG. 6, for example. When the detection process starts, the ultrasonic sensor 19 detects a voltage value corresponding to the intensity of ultrasonic waves and outputs the value to the control portion 5 as the sheet S1 is conveyed. The control portion 5 sequentially acquires voltage values detected by the ultrasonic sensor 19. Step S12 is an example of the sheet detection step of the present invention.

In step S13, the control portion 5 determines whether or not the trailing edge of the sheet S1 has been detected. In a case where the control portion 5 has detected the trailing edge of the sheet S1 (S13: Yes), the process proceeds to step S14. The control portion 5 waits until the trailing edge of the sheet S1 is detected (S13: No). When the control portion 5 detects the trailing edge of the sheet S1 (S13: Yes), the control portion 5 causes the ultrasonic sensor 19 to stop the detection process in step S14. For example, in a case where the control portion 5 has detected the trailing edge of the sheet S1 at the measurement position P3, the control portion 5 causes the ultrasonic sensor 19 to stop the detection process. The detection process by the ultrasonic sensor 19 is continued until the trailing edge of the sheet S1 is detected. In this way, the control portion 5 acquires the voltage values detected by the ultrasonic sensor 19 over the entire surface of the sheet S1. FIG. 6 shows corresponding change in voltage values for the sheet S1.

In step S15, the control portion 5 determines whether or not the fluctuation value (voltage difference) of the voltage value in the detection result corresponding to the sheet S1 is equal to or greater than a threshold value. In a case where it is determined that the voltage difference is equal to or greater than the threshold value (S15: Yes), the process proceeds to step S16. On the other hand, in a case where it is not determined that the voltage difference is equal to or greater than the threshold value (S15: No), the process proceeds to step S17. Step S15 is an example of a determination step of the present invention.

In step S16, the control portion 5 adjusts the amount of light emitted from the CIS sensor 23 and irradiated onto the sheet S1. For example, as shown in FIG. 6, in a case where the voltage difference (V2–V3) between the voltage value V3 of the glued area AR1 of the sheet S1 and the voltage value V2 of the remaining area AR2 of the sheet S1 is equal to or greater than the threshold value, and the voltage value V2 is lower than the voltage value V3, the control portion 5 increases the amount of light irradiated onto the glued area AR1 and reduces the amount of light irradiated onto the remaining area AR2. Step S16 is an example of an execution step of the present invention.

In step S17, the control portion 5 executes an image reading process for reading an image. The control portion 5 stores the read image data in the storage portion 7.

Note that in steps S16 and S17, the control portion 5 may read the image of the sheet S1 irradiated with light, the light amount of which is adjusted, and perform predetermined image processing on the read image. For example, in a case where the read image is tilted with respect to the sheet S1, the control portion 5 executes a correction process for correcting the tilt of the image.

After the process of step S17 is completed, the process returns to step S11, and the control portion 5 repeats the above process for the next sheet S1. As described above, the control portion 5 executes the image reading process.

Figure 8:
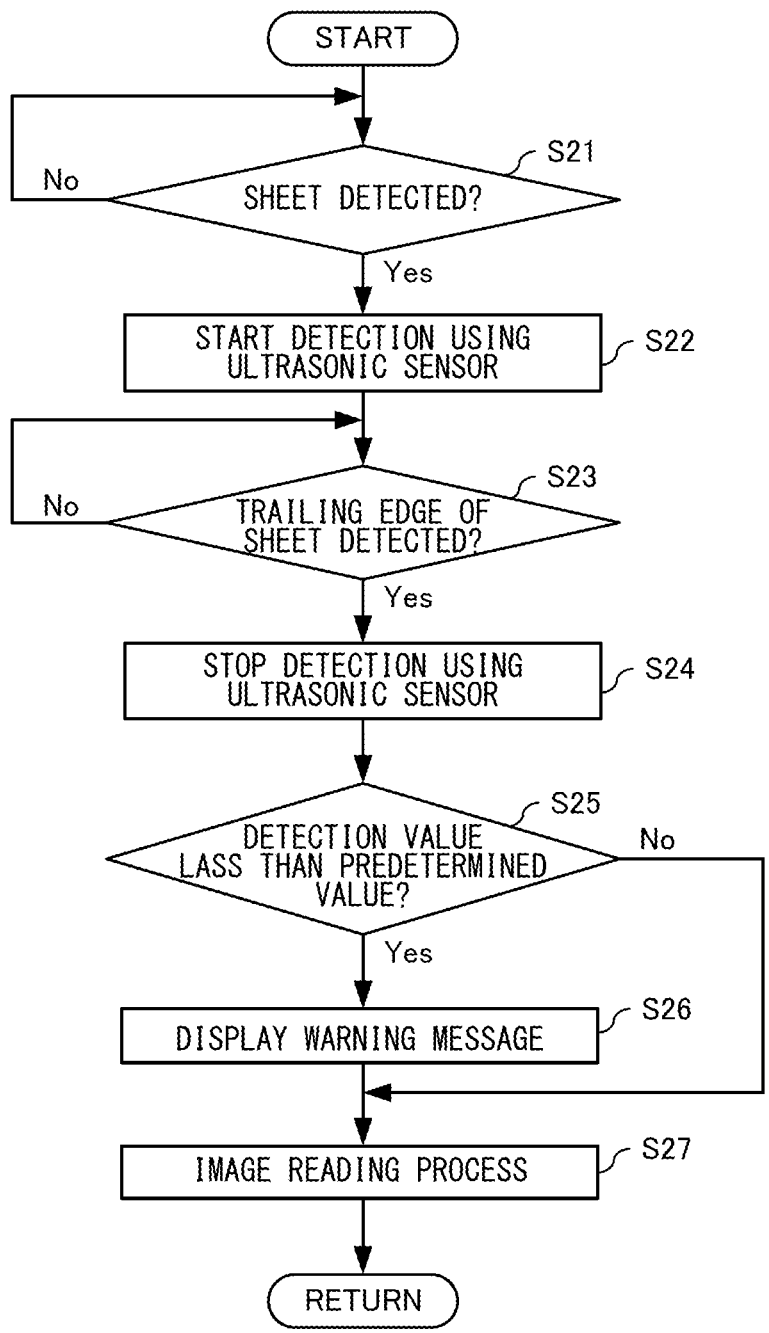
FIG. 8 is a flowchart for describing an example of a procedure of an image reading process executed by an image forming apparatus according to an embodiment of the present invention.

FIG. 8 shows another example of an image reading process. In the image reading process shown in FIG. 8, steps S21 to S24 and S27 are the same as steps S11 to S14 and S17 in the image reading process shown in FIG. 7, so a description thereof will be omitted.

In step S25, the control portion 5 determines whether or not the voltage value in the detection result corresponding to the sheet S1 is less than a predetermined value. In a case where it is determined that the voltage value is less than the predetermined value (S25: Yes), the process proceeds to step S26. On the other hand, in a case where it is not determined that the voltage value is less than the predetermined value (S25: No), the process proceeds to step S27.

In step S26, the control portion 5 causes the operation display portion 6 to display a warning message. That is, in a case where the thickness of the sheet S1 is equal to or greater than the predetermined thickness, the control portion 5 causes the operation display portion 6 to display a warning message. Note that in step S26, the control portion 5 may stop the conveying process of conveying the sheet S1, or may discharge the sheet S1 to a predetermined discharge tray.

As described above, in a case where a plurality of bound sheets S1 are fed to the conveying path 18, a detection value (voltage value) that changes according to the thickness of the sheets S1 is detected at a predetermined measurement position on the conveying path 18, and the fluctuation value of the detected voltage value is equal to or greater than the preset threshold value, the image forming apparatus 10 executes specific processing corresponding to the sheets S1. For example, the image forming apparatus 10 adjusts the amount of light emitted from the CIS sensor 23 and irradiated onto the sheet S1. In addition, in a case of conveying a plurality of bound sheets S1, the image forming apparatus 10 stops (turns OFF) the multi-feeding detection function. Thus, it is possible to improve the accuracy of reading a plurality of bound sheets. Further, it is possible to perform predetermined image processing on the read image with high accuracy.

The image forming apparatus 10 may form an image read by the image reading portion 2 on a sheet 2 that is fed from the sheet storing portion 41.

More specifically, as shown in FIG. 1, in the sheet feed portion 4, the sheet feed roller portion 42 (feed portion) includes a pickup roller 42a and a separating roller 42b. The pickup roller 42a, by being driven by a motor (not shown) whose driving is controlled by the control portion 5, pulls out the sheets S2 one by one at the sheet feed start position P6 where the sheets S2 are started to be fed and conveyed in the conveying direction D2.

When starting the image forming process, the control portion 5 controls the pickup roller 42a and the conveying roller 31 to move the sheet S2 from the sheet storing portion 41 to the registration roller 32. After the sheet S2 reaches the registration roller 32 (registration position P7), the control portion 5 stops the registration roller 32. After that, when the image forming process becomes possible, the control portion 5 starts driving the registration roller 32 to restart conveying the sheet S2, and starts image forming process at the image forming position P8, and forms an image on the sheet S2.

The image forming portion 3 is an electrophotographic image forming portion that forms an image on the sheet S2 supplied from the sheet storing portion 41 based on image data read by the image reading portion 2 or image data input from an external information processing apparatus such as a personal computer. More specifically, the image forming portion 3 includes a photoconductor drum 33, a charging device, a laser scanner unit (LSU), a developing device, a transfer roller, a static neutralization device, a fixing roller, a pressure roller, and the like. Note that the image forming portion 3 may be an inkjet type image forming portion.

The scope of the present invention is defined by the appended claims rather than by the preceding detailed description, and it should be understood that the embodiments described herein are illustrative only and non-limiting. Therefore, all modifications or equivalents that do not depart from the scope of the claims are included in the scope of the claims.

The invention claimed is:

1. An image reading apparatus, comprising:
a sheet feed portion configured to feed a plurality of bonded sheets to a conveying path;
a sheet detection portion configured to transmit ultrasonic waves to the sheet at a predetermined measurement position on the conveying path and detect a voltage value corresponding to an intensity of received ultrasonic waves;
a light amount detecting portion configured to irradiate light onto the sheet and detect reflected light from the sheet at an image reading position for reading an image of the sheet;
a determination processing portion configured to determine whether or not a voltage difference between a voltage value of a first area of the sheet and a voltage value of a second area of the sheet excluding the first area is equal to or greater than a preset threshold value; and
an execution processing portion configured to adjust an amount of light emitted from the light amount detecting portion and irradiated onto the sheet in a case where the determination processing portion determines that the voltage difference is equal to or greater than the threshold value; wherein
the light amount detecting portion comprises a first light source arranged further on a conveying direction side than the image reading position, and a second light source arranged further on an opposite side to the conveying direction than the image reading position; and
in a case where the determination processing portion determines that the voltage difference is equal to or greater than the threshold value, the execution processing portion causes the amounts of light emitted from the first light source and the second light source and irradiated onto the sheet to differ from each other.

2. The image reading apparatus according to claim 1, wherein
in a case where the voltage difference is equal to or greater than the threshold value and an attenuation factor of ultrasonic waves corresponding to the first area is greater than an attenuation factor of ultrasonic waves corresponding to the second area, the execution processing portion makes the amount of light irradiated onto the first area larger than an amount of light irradiated onto the second area.

3. The image reading apparatus according to claim 1, wherein
in a case where the determination processing portion determines that the voltage difference is equal to or greater than the threshold value, the execution processing portion makes an amount of light emitted from the second light source to be greater than an amount of light emitted from the first light source.

4. The image reading apparatus according to claim 1, wherein
the execution processing portion reads an image of the sheet irradiated with light whose light amount has been adjusted, and executes predetermined image processing on the read image.

5. The image reading apparatus according to claim 4, wherein
in a case where a read image is tilted with respect to the sheet, the execution processing portion executes a correction process of correcting the tilt of the image.

6. An image forming apparatus comprising:
the image reading apparatus according to claim 1; and an image forming portion configured to form an image on the sheet.

7. An image reading method comprising:
feeding a plurality of bonded sheets to a conveying path;
transmitting ultrasonic waves to the sheet at a predetermined measurement position on the conveying path and detecting a voltage value corresponding to an intensity of received ultrasonic waves;
irradiating light onto the sheet and detecting reflected light from the sheet at an image reading position for reading an image of the sheet;
determining whether or not a voltage difference between a voltage value of a first area of the sheet and a voltage value of a second area of the sheet excluding the first area is equal to or greater than a preset threshold value; and
in a case where the voltage difference is determined to be equal to or greater than the threshold value, making an amount of light irradiated onto the sheet from a first light source arranged further on a conveying direction side than the image reading position and an amount of light irradiated onto the sheet from a second light source arranged further on a side opposite to the conveying direction side than the image reading position different from each other.

* * * * *